United States Patent [19]

Porta et al.

[11] 3,890,104
[45] *June 17, 1975

[54] CATALYTIC CARTRIDGE

[75] Inventors: Paolo Della Porta; Bruno Ferrario; Angelo Cantaluppi; Paolo Montalenti; Fiziano A. Giorgi, all of Milan, Italy

[73] Assignee: Saes Getters S.p.A., Milan, Italy

[ * ] Notice: The portion of the term of this patent subsequent to Dec. 31, 1991, has been disclaimed.

[22] Filed: May 3, 1972

[21] Appl. No.: 249,771

Related U.S. Application Data

[63] Continuation-in-part of Ser. No. 194,445, Nov. 1, 1971, Pat. No. 3,857,680.

[30] Foreign Application Priority Data
Nov. 3, 1970 Italy ............................. 31307/70

[52] U.S. Cl. .......... 23/288 K; 23/288 R; 23/288 M; 29/157.3 R; 29/157.3 B; 29/191; 113/118 B; 165/179; 252/477 R
[51] Int. Cl.². B01J 8/04; B21D 53/02; B23P 15/26
[58] Field of Search .......... 23/288 R, 288 L, 288 M, 23/288 F, 288 K, 288 H, 288 (U.S. only); 252/477 R; 29/191, 157.3 R, 157.3 A, 157.3 B; 113/116 Y, 118 B; 165/179

[56] References Cited
UNITED STATES PATENTS

| 2,526,657 | 10/1950 | Guyer | 23/288 M |
|---|---|---|---|
| 2,611,585 | 9/1952 | Boling | 165/179 X |
| 2,756,032 | 7/1956 | Dowell | 29/157.3 A UX |
| 2,778,610 | 1/1957 | Bruegger | 23/288 K |
| 2,887,456 | 5/1959 | Halford et al. | 23/288 F UX |
| 3,197,975 | 8/1965 | Boling | 29/157.3 R UX |
| 3,652,317 | 3/1972 | Porta et al. | 117/22 |

OTHER PUBLICATIONS
Orzechowski et al., The Silver Catalyzed Oxidation of Ethylene, Canadian Journal of Chemistry, Vol. 32, 415-431, (1953).

*Primary Examiner*—Joseph Scovronek
*Attorney, Agent, or Firm*—Littlepage, Quaintance, Murphy & Dobyns

[57] ABSTRACT

A catalytic cartridge formed of a strip folded alternately in opposite directions such that the strip comprises a plurality of members. Each member comprises a first spirated segment, an outer circumferential segment, a second spirated segment, and an inner circumferential segment. The inner circumferential segment of any given member is attached to the first spirated segment of the next member. A catalytic material is carried by the strip.

10 Claims, 13 Drawing Figures

3,890,104

PATENTED JUN 17 1975

SHEET 1

3,890,104

CATALYTIC CARTRIDGE

CROSS-REFERENCE TO RELATED APPLICATIONS

This application is a continuation-in-part of application Ser. No. 194,445 filed Nov. 1, 1971 entitled Catalytic Structure, now U.S. Pat. No. 3,857,680, issued Dec. 31, 1974, the disclosure of which is incorporated herein by reference.

Catalytic cartridges employing a folded strip which carries a catalytic material are well known in the art. See for example Guyer U.S. Pat. No. 2,526,657 (1950); Halford et al. U.S. Pat. No. 2,887,456 (1959); Ehrenfeld U.S. Pat. No. 3,206,334 (1965) and Ruff et al. U.S. Pat. No. 3,208,131 (1965). All of these patents disclose the well-known technique of depositing a catalytic material on a strip, folding the strip, and then inserting the folded strip in a sleeve, tube or housing or other suitable means for confining the reactants to be reacted to the vicinity of the catalytic material. One of the most commonly employed catalytic cartridges is that employing a strip folded alternately back and forth as shown for example in FIGS. 2 and 3 of Ruff et al.

However, the above-described and other prior art catalytic cartridges suffer from a number of disadvantages. Although they are frequently designed to fit inside a housing, they exhibit poor heat conductance between the catalytic material carried by the strip and the housing. This is particularly disadvantageous since heat is absorbed or generated at the catalyst. It is desirable, but in these constructions impossible, to rapidly conduct the heat away from the catalytic material to a heat sink located outside the housing or tube. This is true, whether the chemical reaction to be catalyzed is exothermic or endothermic, i.e. whether the addition or removal of heat from the reaction-zone tends to aid completion of the reaction. Furthermore, many of the prior art catalytic cartridges exhibit undesirable deformation due to thermally-induced stresses. Under common manufacturing techniques the catalytic cartridge is inserted into its housing at ambient temperatures, whereas the reaction generally takes place at superambient temperatures or subambient temperatures. This use of temperatures different than ambient causes deformation and/or the inducement of thermal stresses within the catalytic cartridge. These thermal stresses can cause undesirable distortion of the cartridge and under extreme conditions even rupture of the housing.

Most of the procedures required for the manufacture of these prior catalytic cartridges requires the use of molten metal techniques such as welding or brazing. The use of these techniques is undesirable for several reasons. Firstly, they are expensive. However, probably more serious is the inclusion in the welding alloy or brazing alloy of elements which are deleterious to the catalytic material. For example, it is well known that silica, iron, or phosphorus have a detrimental effect on platinum or palladium catalysts. (See Ruff et al. especially col. 4, Lines 50–57). Furthermore, it is well known that sulphur, which is frequently present in welding or brazing alloys, has a deleterious effect on other catalysts.

Still other prior art catalysts are not easily replaced within their housing while yet others are complicated to construct and install.

It is therefore an object of the present invention to provide an improved catalytic cartridge which is substantially free of the disadvantages of prior art cartridges.

Another object is to provide an improved catalytic cartridge which exhibits good heat transfer to its housing at ambient temperatures and at temperatures widely varying from ambient.

A further object is to provide an improved catalytic cartridge which is substantially free of thermally-induced stresses over a wide temperature range.

A still further object is to provide an improved catalytic cartridge which does not require the use of molten metal techniques such as welding or brazing in its fabrication.

Yet another object is to provide a catalytic cartridge which is easily replaced within its housing and is simple to construct and install.

Still another object is to provide a novel method for constructing the catalytic cartridges of the present invention.

Additional objects and advantages of the present invention will be apparent to those skilled in the art by reference to the detailed description thereof and figures wherein.

According to the broadest aspects of the present invention, there is provided an improved catalytic cartridge formed of a strip folded alternately in opposite directions such that the strip comprises a plurality of members. Each of the members comprises a first spirated segment, an outer circumferential segment attached to the first spirated segment, a second spirated segment attached to the outer circumferential segment and an inner circumferential segment attached to the second spirated segment. In the catalytic cartridges of the present invention the inner circumferential segment of any given member is attached to the first spirated segment of the next member. A catalytic material is carried by the strip.

Figure 1:
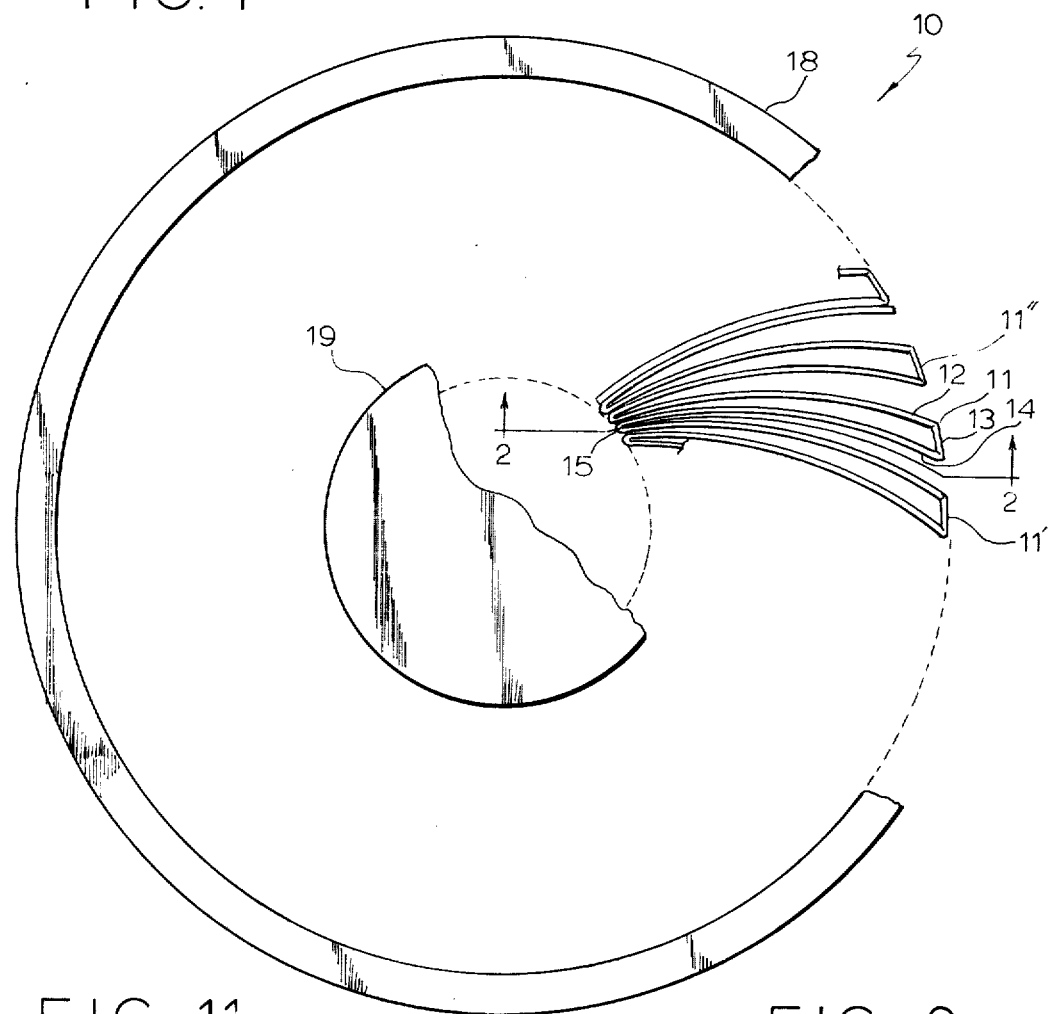
FIG. 1 is a partially cutaway top view of a catalytic cartridge of the present invention shown in cooperation with its housing.
Figure 2:
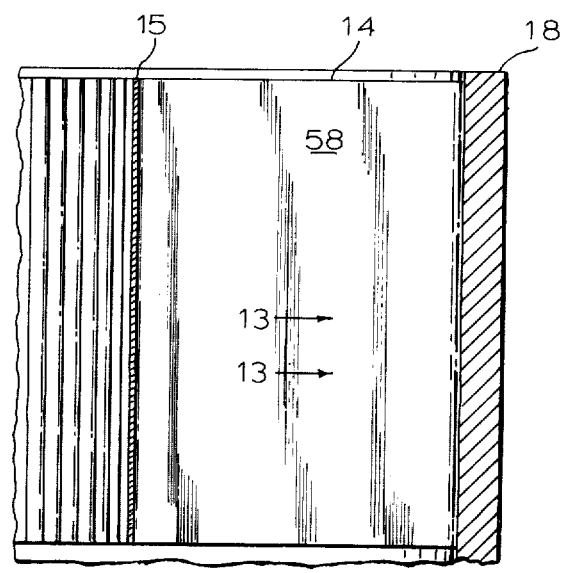
FIG. 2 is a sectional view taken along the line 2—2 of FIG. 1.

Referring now to the drawings and in particular to FIG. 1, there is shown a catalytic cartridge 10 of the present invention. The catalytic cartridge 10 comprises a plurality of members such as members 11, 11' and 11''. The member 11 is representative and comprises a first spirated segment 12, an outer circumferential segment 13, a second spirated segment 14, and an inner circumferential segment 15. In FIG. 1 the catalytic cartridge 10 has been placed within its housing or sleeve 18. Within the cartridge 10 is a plug 19, the structure and function of which is described below.

Figure 3:
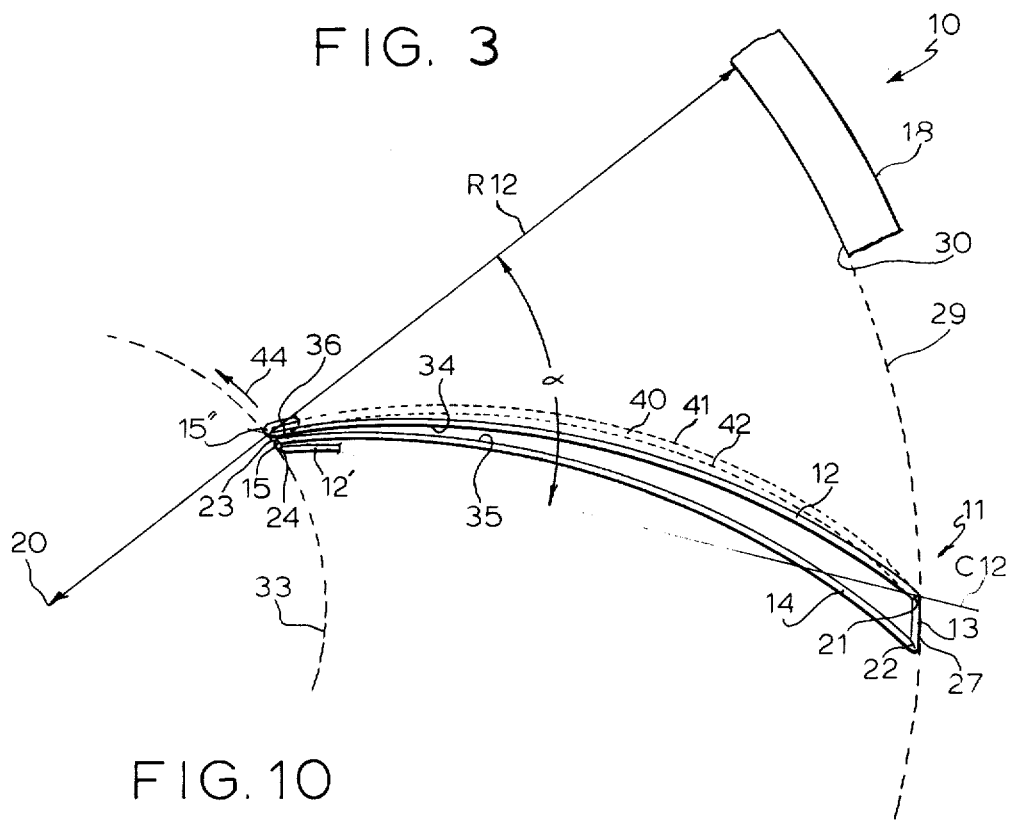
FIG. 3 is an enlarged view of one member of the catalytic cartridge of FIG. 1.

Referring now to FIG. 3, there is shown the representative member 11 of FIG. 1. The first spirated segment 12 extends outwardly from the center 20 of the cartridge 10 in a curved manner. As can be seen, a chord C12 of the curve of the segment 12 is at an acute angle α to the radius R12 of the cartridge 10. The segment 12 lies between the chord C12 and the radius R12. A similar relationship exists between a chord C14 (not shown) of the segment 14 and a similarly described radius R14 (not shown). The segment 12 is attached to the segment 13 along their common fold line 21. The segment 13 is attached to the segment 14 along their common fold line 22. The segment 14 is attached to the segment 15 along their common fold line 23. The segment 15 is in turn attached to the first spirated segment 12' of the next adjacent member 11' along their common fold line 24. In this manner subsequent segments are attached to each other.

By reference to FIG. 3 it can be seen that the outer wall 27 of the member 13 and the corresponding outer walls of the members 13', 13'', etc. (see FIG. 1) describe a cylindrical surface which comprises the outer periphery 29 of the cartridge 10. This cylindrical surface is interrupted only by the spaces between the segments 13, 13'. Because of the structure of the cartridge 10 the outer periphery 29 is coincidental with the inner wall 30 of the sleeve 18.

Still referring to FIG. 3, it can be seen that the inner circumferential segments 15 and 15'' and the other inner circumferential segments not shown describe a circle 33 concentric to the outer periphery 29 of the cartridge 10. The wall 34 of the segment 12 and the wall 35 of the segment 14 touch each other at the point 36 in the vicinity of the inner circumferential segments 15 and 15''. It is by means of this structural relationship, among other, that the cartridge retains its rigidity and flexibility, although it is completely unnecessary to use any molten metal techniques such as brazing or welding to construct the cartridge 10.

The members 11, 11',11'' etc. and therefore the cartridge 10 exhibits structural stability over a wide temperature range. Furthermore, thermally-induced stresses within the cartridge 10 are minimized and, because of the particular structure of the cartridge 10, are employed to insure good heat conduction between the segment 13 and the sleeve 18. Referring still to FIG. 3, if a cartridge 10 be inserted into a sleeve 19 having the configuration shown at ambient temperatures and if the member 11 be heated while maintaining the temperature of the sleeve 18, the segment 12 will move to the position 40 shown by the dotted lines 41 and 42 representing the two walls of the segment 12. This incipient expansion of the segment 12 will cause the segment 13 to press against the sleeve 18 in the vicinity of the fold line 21 insuring good contact between the outer wall 27 of the segment 13 and the inner wall 30 of the sleeve 18. However, this force is prevented from becoming exceedingly great because of the ability of the segment 12 to further bend. The other spirated segments 12', 14', 12'' and 14'' etc. will likewise bend. If the temperature is consistent, the spacing between the spirated segments will not vary. In the cartridge 10 of the present invention a further stressrelieving mechanism is provided by the free-standing nature of the inner circumferential segments 15, 15', 15'', etc. by which they are free to move when heated in the direction of the arrow 44 in order to further relieve stresses.

Because of the above-described structural relationship, it will be apparent that the cartridge 10 of the present invention exhibits good heat transfer from the spirated segments 12, 14 to the outer circumferential segment 13 and thence to the sleeve 18. When the sleeve 18 contains a heat transfer medium on the outside, heat can be rapidly added to or removed from the spirated segments 12, 14. Furthermore, because of the spirated nature of the segments 12 and 14 and the free floating nature of the inner circumferential segments 15, 15', 15'', etc., thermally-induced stresses are controlled, whereas the spacing of the spirated segments one from the other is maintained over a wide temperature range.

The strip can be any metal which can be mechanically worked to form the cartridge of the present invention. However, aluminum is most preferred. Strips of iron and other ferrous alloys are preferred because of cost, availability, their general inertness to most chemical reactions and their ability to be mechanically worked. The strips of the present invention are generally quite thin, almost always less than 0.10 inch and generally are approximately 0.01 inch.

The catalyst which is carried by the strip can be any catalyst known to catalyze the given chemical reaction. The catalysts are chosen according to known chemical techniques without reference to the present invention.

Figure 11:
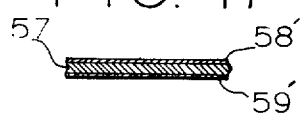
FIGS. 11, 12 and 13 illustrate the means by which the catalytic material can be carried by the strip.
Figure 12:
Figure 13:
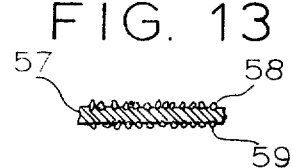

As shown in FIGS. 11, 12 and 13, the catalyst can be carried by the strip 57 in any convenient manner. In FIG. 11 the catalyst 58', 59' has been electrochemically plated onto the strip 57 in the manner described in Suter et al. U.S. Pat. No. 2,720,494 (1955) or as described in Ruff et al supra. As shown in FIG. 12, the catalyst 58' is carried by the strip by simply forming the strip of the catalytic material. FIG. 13 represents the preferred method of attaching the catalyst 58, 59 to the strip and is described in U.S. Patent application Ser. No. 527,906 abandoned corresponding to Italian Pat. No. 746,551. Other methods for attaching the catalyst to the strip are disclosed in della Porta et al. U.S. Pat. No. 3,652,317 and U.S. Pat. application Ser. No. 249,772 filed approximately concurrently herewith.

Figure 8:
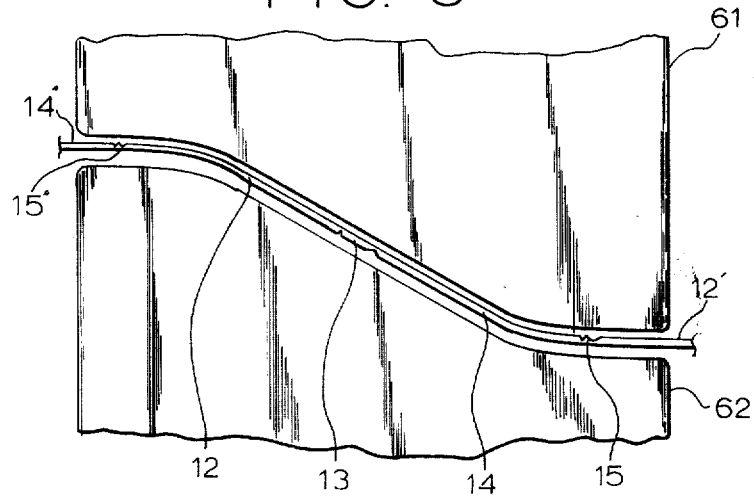
FIG. 8 is a sectional view of a stamping die which can be employed to form the strip.

According to another aspect of the present invention there is provided an improved process for producing the catalytic cartridges of the present invention. In general, the process comprises providing the strip with transverse fold lines. The distance between the fold lines corresponds generally to the above-described segments. Those portions of the strip corresponding to the first and second spirated segments are then curved. The curved strip is then folded its fold lines. The strip is then subsequently or simultaneously formed into the general ring-shaped nature shown in FIG. 1 by forming the inner circumferential segments into a circle. The curving of the strip is shown in FIG. 8 wherein there is shown an upper curving die 61 and a lower curving die 62.

Figure 4:
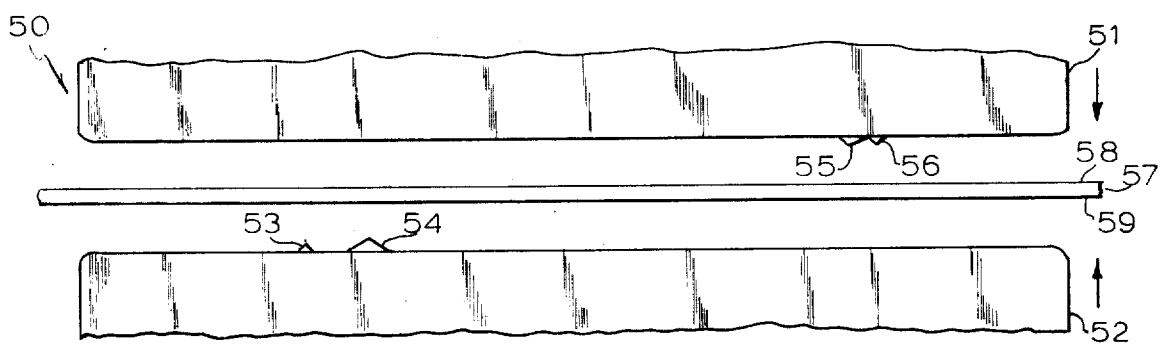
FIG. 4 is a schematic representation showing a stamping die and a strip to be employed in the catalytic cartridges of the present invention showing the manner in which fold lines are impressed on the strip.
Figure 5:
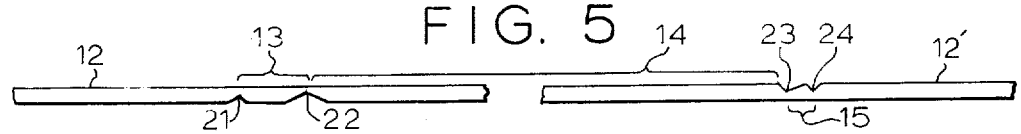
FIG. 5 is a view of that section of the strip shown in FIG. 4 after having been stamped.
Figure 6:
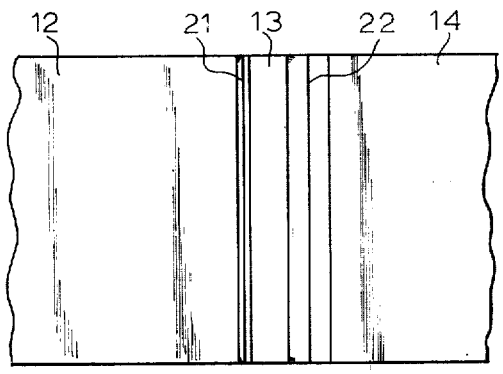
FIG. 6 is an upwardly-looking view of the strip shown in FIG. 5.
Figure 7:
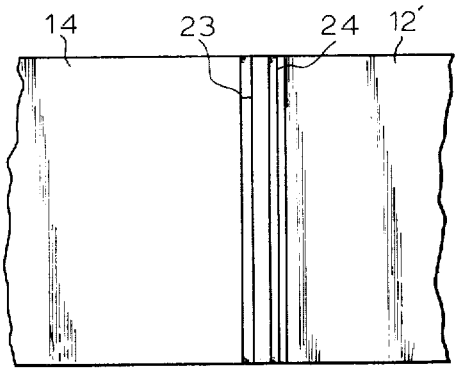
FIG. 7 is a downwardly-looking view of the strip shown in FIG. 5.

Referring now to FIG. 4, there is shown a two-platen press 50 having an upper platen 51 and a lower platen 52. The upper platen is provided with projections 53 and 54, whereas the lower platen is provided with projections 55 and 56. Placed between the platens 51 and 52 is a strip 56 carrying a catalytic material 58, 59 on each side thereof. The platens 51, 52 are caused to move toward each other with the result that the projections 53, 54, 55, 56 embed themselves in the strip 57 producing respectively fold lines 21, 22, 23, 24 shown in FIGS. 5, 6 and 7.

Figure 10:
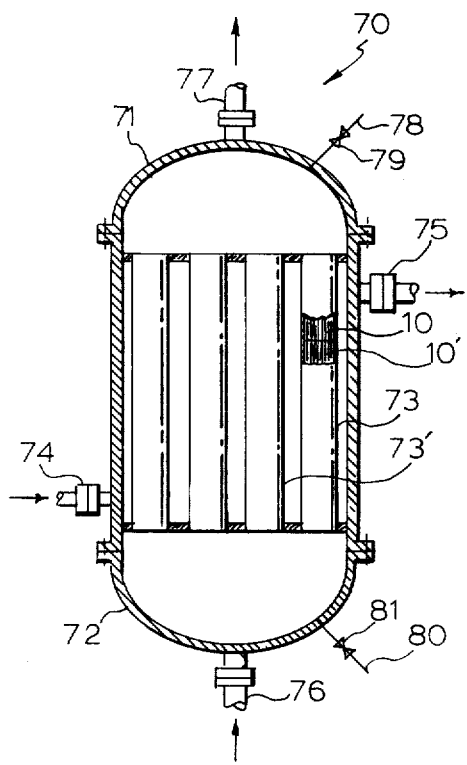
FIG. 10 is a view of a shell and tube heat exchanger containing catalytic cartridges which have been inserted into the tubes in the manner shown in FIG. 9.
Figure 9:
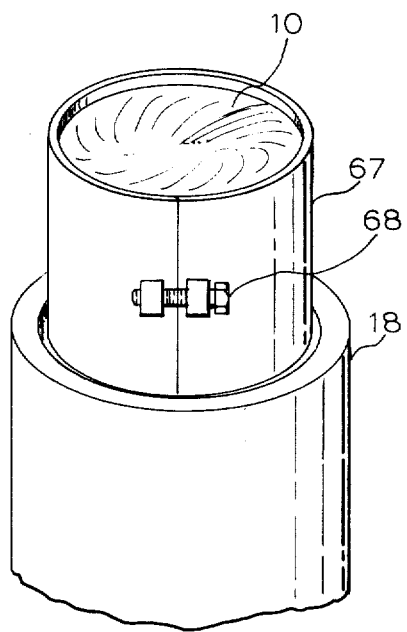
FIG. 9 is an isometric view illustrating how the cartridge of the present invention can be compressed to insert it into a housing.

Referring now to FIGS. 9 and 10 there is shown the manner of using the catalytic cartridges of the present invention. As shown in FIG. 9, the cartridge 10 has been surrounded by a circular flexible sheet metal sheet 67 the ends of which can be drawn together by means of a bolt 68 thus making the circumference of the sheet 67 smaller. The bolt 68 is tightened until the outer periphery 29 (see FIG. 3) is tightened until it is smaller than the diameter of the sleeve 18. The sheet 67 is then placed next to the sheet 18 and the cartridge 10 slid from the sheet 67 into the tube 18 whereupon the cartridge 10 expands such that the outer circumferential segments 13 of each member 11, 11', 11" contact the inside walls of the sleeve 18.

Referring now to FIG. 10, there is shown a common shell and tube heat exchanger 70 having removable bell housings 71 and 72 and a plurality of tubes 73, 73' corresponding generally to the sleeve 18. The heat transfer medium enters through the inlet 74 and leaves through the outlet 75. The reactants enter through inlet 76 and leave through outlet 77. When both of the reactants are gasses, they are generally mixed and fed to the heat exchanger 70 through the inlet 76. However, if one of the reactants is a liquid, it can be fed to the heat exchanger 70 through the line 78 containing a valve 79. Liquid from the heat exchanger 70 can be removed via line 80 containing valve 81.

There are a number of advantages to the catalytic cartridge of the present invention which render it especially advantageous when the reactants are all gaseous as well as when one or more of the reactants is a liquid. When all reactants are gasses, there will be intimate contact of the gasses with the catalytic material by virtue of the small spacing between spirated segments. When employing the cartridges 10 of the present invention in a heat exchanger 70 it may be advantageous to employ a plug 19 (see FIG. 1). In this embodiment the open space surrounding the center 20 of the the cartridge 10 generally is a dead space with no flow of gasses either in or out of the space.

If some of the reactants are gaseous and some of the reactants are liquid, the liquid reactants are charged to the heat exchanger 70 through the line 78 in a manner slow enough to permit the liquid to trickle down through the tubes 73, 73' and over the spirated segments 12, 14, 12', 14', etc. Because the layer of liquid covering the segments 12, 14, 12', 14', etc. is very thin, the diffusion of reactant gasses through the liquid layer to the catalytic material covering the segments 12, 14, 12',14', etc. is quite rapid resulting in a rapid reaction.

Alternatively, the liquid can be injected into the gaseous stream of reactants in the form of fine droplets forming an aerosol. The aerosol can be caused to flow through the segments 12, 14, 12', 14', etc. at such a rapid rate that the droplets of liquid are in turbulent flow bouncing from one surface of one segment to an adjacent surface of an adjacent segment, thereby giving good contact between the aerosol and the catalytic material carried by the segments.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the construction of a specific embodiment of the present invention.

A strip of aluminum 0.01 inch in thickness is provided with a coating of silver deposited by electrochemical means. The strip is then provided with fold lines as described herein with respect to FIGS. 4–7. The strip is then given curvature as described herein with respect to FIG. 8 and is then folded to form a cartridge as shown in FIG. 1. The cartridge 10 is then placed into a sleeve 18 in the manner shown in FIG. 9 whereupon a mixture of one mole of ethylene and one-half mole of oxygen is passed through the cartridge 10. Some of the ethylene is converted to ethylene oxide.

EXAMPLE 2

The process of Example 1 is repeated except that the strip is replaced by a strip resembling FIG. 13 produced in accordance with the disclosure of U.S. Pat. application Ser. No. 249,772 filed approximately concurrently herewith.

Although the invention has been described in considerable detail with reference to certain preferred embodiments thereof, it will be understood that variations and modifications can be effected within the spirit and scope of the invention as described above and as defined in the appended claims.

What is claimed is:

1. A catalytic cartridge formed of a metal strip folded alternately in opposite directions such that the strip comprises a plurality of members each comprising:
   A. a first spirated segment;
   B. an outer circumferential segment attached to the first spirated segment;
   C. a second spirated segment attached to the outer circumferential segment;
   D. an inner circumferential segment attached to the second spirated segment;
   wherein the inner circumferential segment of any given member is attached to the first spirated segment of the next member,
   wherein a catalytic material is carried by the strip.

2. The cartridge of claim 1 in combination with a cylindrical sleeve, the inside wall of which is in heat conductive contact with the outer circumferential segments.

3. The catalytic cartridge of claim 1 further comprising a sleeve wherein the outer circumferential segments contact the inner wall of the cylindrical sleeve along substantially all of the outer surface of each circumferential segment.

4. The cartridge of claim 1 wherein the catalytic material is carried by the strip in the form of an electroplated coating thereon.

5. The cartridge of claim 1 wherein the catalytic material is carried by the strip by having the catalytic material in the form of particles adhering to the strip.

6. The cartridge of claim 1 wherein the catalytic material is the strip itself and comprises an alloy.

7. A shell and tube heat exchanger having a plurality of the catalytic cartridges of claim 1 in the tubes thereof.

8. A catalytic cartridge formed of a metal strip folded alternately in opposite directions along fold lines perpendicular to the running length of the strip such that the strip comprises a plurality of members each comprising:
  A. a first spirated segment
   1. which extends outwardly from the center of the cartridge,
   2. which is curved,
   3. wherein a chord of the curve of the first spirated segment is at an acute angle to the radius of the cartridge passing through the inner end of the first spirated segment,
   4. wherein the first spirated segment lies between the cord and the radius,
  B. an outer circumferential segment attached to the first spirated segment along their common fold line,
  C. a second spirated segment attached to the outer circumferential segment along their common fold line,
   1. which extends inwardly from the outer periphery of the cartridge,
   2. which is curved,
   3. wherein a chord of the curve of the second spirated segment is at an acute angle to the radius of the cartridge passing through the inner end of the second spirated segment,
   4. wherein the second spirated segment lies between the chord and the radius,
  D. an inner circumferential segment attached to the second spirated segment along their common fold line, said inner circumferential segment maintaining a separation between the second spirated segment of one member and the first spirated segment of the next adjacent member,
  wherein the inner circumferential segment of any given member is attached to the first spirated segment of the next member,
  wherein a catalytic material is carried by the strip,
  wherein the outer walls of the outer circumferential segments of the members describe an interrupted cylindrical surface comprising the outer periphery of the cartridge,
  wherein the inner circumferential segments describe a circle,
  wherein adjacent walls of first and second spirated segments contact each other in the vicinity of their contiguous inner circumferential segments.

9. A method for producing a catalytic cartridge formed of a metal strip folded alternately in opposite directions such that the strip comprises a plurality of members each comprising:
  A. a first spirated segment;
  B. an outer circumferential segment attached to the first spirated segment;
  C. a second spirated segment attached to the outer circumferential segment;
  D. an inner circumferential segment attached to the second spirated segment;
  wherein the inner circumferential segment of any given member is attached to the first spirated segment of the next member,
  wherein a catalytic material is carried by the strip,
  said method comprising the steps of:
   I. providing the strip with transverse fold lines, the distance between the fold lines corresponding to the segments,
   II. curving those segments of the strip corresponding to the first and second spirated segments,
   III. folding the strip along its fold lines,
   IV. forming the inner circumferential segments into a circle.

10. A method for producing a catalytic cartridge formed of a metal strip alternately in opposite directions along fold lines perpendicular to the running length of the strip such that the strip comprises a plurality of members each comprising:
  A. a first spirated segment
   1. which extends outwardly from the center of the cartridge,
   2. which is curved,
   3. wherein a chord of the curve of the first spirated segment is at an acute angle to the radius of the cartridge passing through the inner end of the first spirated segment,
   4. wherein the first spirated segment lies between the chord and the radius,
  B. an outer circumferential segment attached to the first spirated segment along their common fold line,
  C. a second spirated segment attached to the outer circumferential segment along their common fold line,
   1. which extends inwardly from the outer periphery of the cartridge,
   2. which is curved,
   3. wherein a chord of the curve of the second spirated segment is at an acute angle to the radius of the cartridge passing through the inner end of the second spirated segment,
   4. wherein the second spirated segment lies between the chord and the radius,
  D. an inner circumferential segment attached to the second spirated segment along their common fold line, said inner circumferential segment maintaining a separation between the second spirated segment of one member and the first spirated segment of the next adjacent member,
  wherein the inner circumferential segment of any given member is attached to the first spirated segment of the next member,
  wherein a catalytic material is carried by the strip,
  wherein the outer walls of the outer circumferential segments of the members describe an interrupted cylindrical surface comprising the outer periphery of the cartridge,
  wherein the inner circumferential segments describe a circle,
  wherein adjacent walls of first and second spirated segments contact each other in the vicinity of their contiguous inner circumferential segments,
  said method comprising the steps of:
   I. providing transverse fold lines along a strip wherein the distance between a reference fold line and the first fold line corresponds to the length of the first spirated segment wherein the distance between the first fold line and the second fold line corresponds to the length of the outer circumferential segment, wherein the distance between the third fold line and the fourth fold line corresponds to the length of the second spirated segment, wherein the distance between the third fold line and the fourth fold line corresponds to the length of the inner circumferential segment, II. curving the first and second spirated segments in opposite directions wherein the first spirated segment is curved outwardly in a direction opposite to the side of the strip containing the first and second fold lines, wherein the second spirated segment is curved outwardly a direction the same as the side of the strip containing the first and second fold lines, III. folding the first and second lines such that the curves of the first and second spirated segments lie approximately parallel to one another, IV. folding the third and fourth fold lines in a direction opposite to that of the first and second fold lines, V. forming the folded members into a circle by contacting the first and second spirated segments with each other in the vicinity of their contiguous inner circumferential segments.

* * * * *

UNITED STATES PATENT OFFICE
CERTIFICATE OF CORRECTION

PATENT NO. : 3,890,104

DATED : June 17, 1975

INVENTOR(S) : Paolo della Porta et al

It is certified that error appears in the above-identified patent and that said Letters Patent are hereby corrected as shown below:

[19] The last name of the first named inventor is --della Porta--, and not "Porta".

[75] Change "Della" to --della--; and change "Fiziano" to --Tiziano--.

[30] The priority document number should read --31307A/70--.

Insert --April 29, 1972 Italy................23728A/72--

Column 3, line 58, change "19" to --18--.

Signed and Sealed this ninth Day of September 1975

[SEAL]

Attest:

RUTH C. MASON
*Attesting Officer*

C. MARSHALL DANN
*Commissioner of Patents and Trademarks*